Sept. 22, 1925.
P. PETCHING
THEATRICAL DEVICE
Filed Sept. 29, 1924
1,554,650
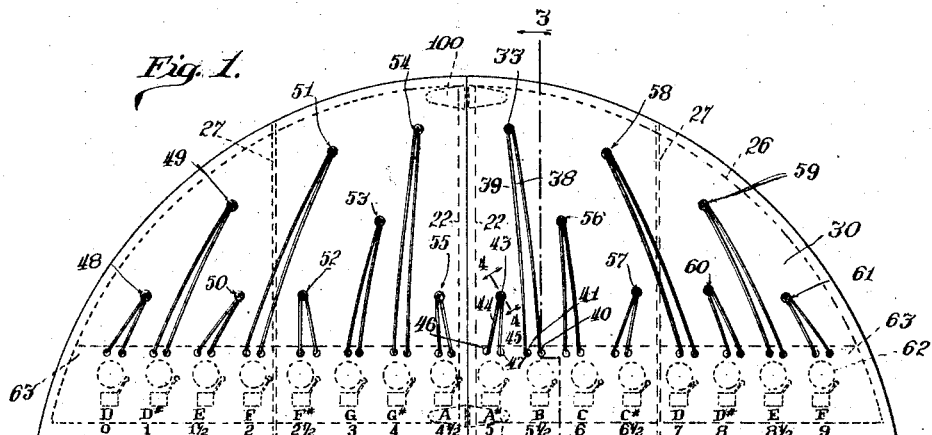
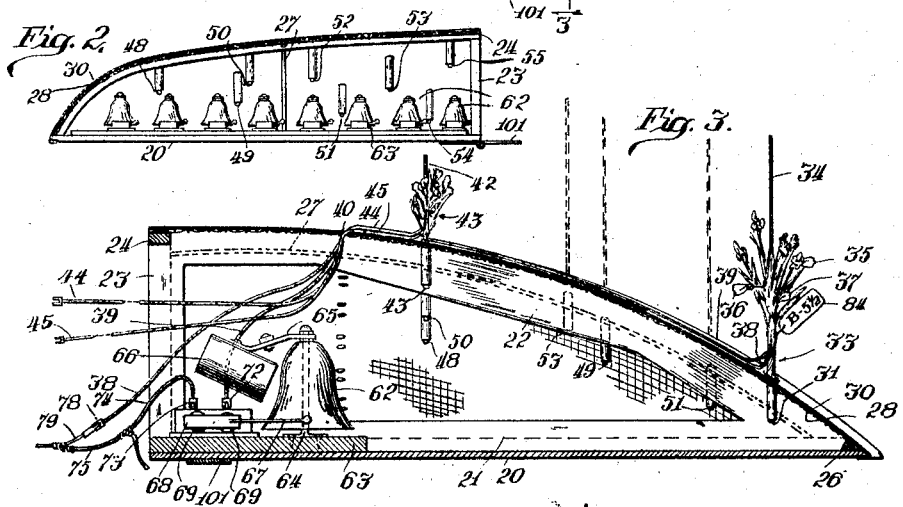
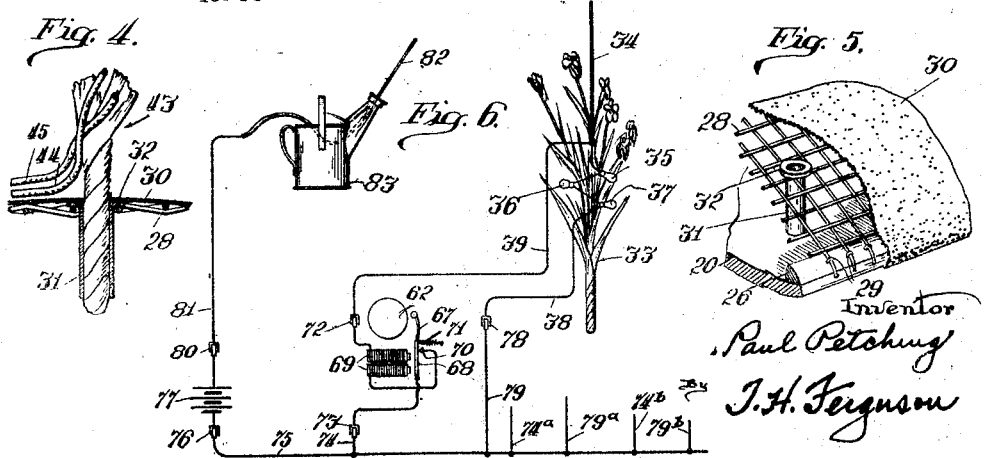
Inventor
Paul Petching
J. H. Ferguson
Attorney Patented Sept. 22, 1925.

1,554,650

UNITED STATES PATENT OFFICE.

PAUL PETCHING, OF LYMANSVILLE, RHODE ISLAND.

THEATRICAL DEVICE.

Application filed September 29, 1924. Serial No. 740,545.

*To all whom it may concern:*

Be it known that I, PAUL PETCHING, a citizen of the United States, and resident of Lymansville, county of Providence, and State of Rhode Island, have invented certain new and useful Improvements in Theatrical Devices, of which the following is a specification.

The present invention relates generally to theatrical devices, and more particularly to devices of this class used in presenting garden scenes with attractive lighting and musical effects, either or both being produced as desired.

One object of the invention is to provide a novel construction by which the scenic members simulating the flowering plants may be readily positioned and removed, and by which new members may be readily added without much additional work. To this end the main scenic member, simulating a flower bed, is preferably constructed at the points where the plants are to be placed, out of wire screen and tubular sockets are set in the openings in the screen, the sockets serving to hold the scenic members simulating the flowering plants.

Another object is to provide a structure wherein the bells employed in producing the musical effects may be conveniently located within the casing which is used to simulate the flower bed, and wherein the bells will be designated by appropriate markings on adjacent portions of the casing.

Another object is to provide convenient electric connections from the source of electricity to the bells, the lamps upon the flower simulating members, and the terminals on the latter by which the bells are controlled and the lamps lighted. The playing and lighting are preferably done by the operator manually pressing a movable terminal against the terminals upon the flower members in predetermined order and timed relation, using the notations on the casing for this purpose, should he so desire. As presented in the present application, the movable terminal under the player's control is attached to a sprinkling can.

These and other features and advantages of the invention will be best understood upon reference to the following detailed description taken in connection with the accompanying drawings, and the scope of the invention will be particularly pointed out in the appended claims.

In said drawings, Fig. 1 is a plan view of a theatrical device constructed and arranged in accordance with the present invention, the flower simulating members being shown merely in section adjacent to the top of the main bed simulating member; Fig. 2 is a rear elevation of one half of the bed simulating member; Fig. 3 is a transverse section taken through the bed simulating member on a plane indicated by the line 3—3 of Fig. 1; Fig. 4 is a view illustrating one of the plant simulating members in elevation and the adjacent socket structure in section, the plane of section being indicated by the line 4—4 of Fig. 1; Fig. 5 is a perspective view of a portion of the bed simulating member illustrating its component parts and one of the tubular supports provided for the reception of the plant simulating members; and Fig. 6 is a diagram of the electrical connections employed in the device. Throughout these views like characters refer to like parts.

Referring to the drawings in detail, it will be noted that the bed simulating member is made up of two sections in the form of sectors, one being shown in Fig. 2, and the two in juxtaposition in Fig. 1. These sectors are similar in construction, and it will suffice to describe one of them in detail. As shown more particularly in Fig. 3, each sector has a bottom 20, end frame members 21, 22 and 23, and a rear frame member 24. The forward edge of each sector is also provided with a curved member 26. The end frame members 21, 22 and 23 of each sector are brought together, when the parts are assembled as indicated in Fig. 1, and the upper members 24 of each sector are brought into alignment. The bottom 20 in each instance is composed of some light material such as wood in a solid piece or thin layers glued together. The other frame members are preferably composed of wood. Each sector is also reinforced by a metal rod 27 which extends between the forward frame member 26 and the rear frame member 24. This rod is curved to conform to the shape of the upper surface of the completed bed simulating member, as indicated more particularly in Fig. 3. Upon this frame structure a covering of wire screen 28 is provided. This covering is curved to agree approximately with the shape of the surface of a flower bed. The screen 28 is suitably secured to the peripheral member 26, to the end frame member 22, and to the rear frame member 24 by any suitable means, as by means of staples 29, as indicated in Fig. 5. The upper surface of the screen 28 is then covered with a piece of canvas or like fabric 30. This fabric is secured at its edges to the same members as the screen 28 by any suitable means. The upper surface of the fabric 30 is painted or otherwise decorated to represent the earth in which the flowers are apparently planted.

In order to properly position the flower simulating members, I provide in the bed members a plurality of sockets or tubes. These may be positioned at any desired points upon the bed structure. Preferably the construction is that illustrated more particularly in Figs. 4 and 5 wherein the screen 28 has a mesh which just allows the tube 31 to pass through an opening in the screen without cutting any of the wires. Preferably the upper end of the tube 31 is flanged at 32, and the flange rests upon the adjacent wires of the screen. It is also preferable to have the tubes 31 firmly secured to the screen, and for this purpose the former are preferably soldered to the latter at a point adjacent to the flange. Obviously the screen might have a different size mesh and yet the tubes be properly secured thereto. In order that the stem of the plant simulating member may be thrust into the opening in the tube, the fabric 30 is pierced at a point directly above the opening in each tube and the stem of the plant member passes down through the pierced opening into the tubular opening in the socket, all as clearly indicated in Fig. 4.

The plant simulating members are of practically the same construction throughout, although obviously the different members would be constructed to represent different kinds of plants and flowers. Referring to the plant member 33 toward the forward end of the bed, it will be seen that the stem is provided with an upwardly extending electric terminal 34. This terminal is connected with a plurality of lamps 35, 36 and 37, mounted upon the plant member and preferably being located within the flowers upon the same. The circuit from the lamps is continued through a wire 38. A companion wire 39 is connected to the same terminal 34 in parallel with the circuit through the lamps. The two wires 38 and 39, which are insulated, pass from the stem of the plant member 33 along over the upper surface of the fabric 30 to a point not far from the rear of the bed simulating member. There they pass through openings 40 and 41 in the fabric 30 to the interior of the bed member. In like manner, the terminal 42 on the plant member 43 is provided with a similar set of lamps and with conductors 44 and 45 which pass through similar openings 46 and 47 into the interior of the bed member. In like manner, the other plant members 48, 49, 50, 51, 52, 53, 54, 55, 56, 57, 58, 59, 60, and 61, are provided with pairs of conductors which lead through similarly positioned openings into the interior of casing. It may be pointed out that the conductors on these several plant members are made long enough to permit the plants to be variously positioned upon the bed simulating member. In other words, it is not necessary to always have the plant members in the same position. As representative of this, portions of the conductors 44 and 45, as shown in Fig. 3, are shown in dotted lines.

Along the rear of the bed simulating members and just within the same, I position a number of electrically operated bells 62. These bells are mounted upon two trays or boards 63, one for each sector. The bells are tuned to produce different notes of a diatonic scale. Directly above each bell is a designation which corresponds to that particular bell. In the present instance these designations are the notes of the diatonic scale beginning with D and extending through F in the next succeeding octave. Besides having the note designations, I also have numbered several of the bells, in some instances giving half numbers, all as indicated in Fig. 1. These bells are to be operated so as to play different tunes thereon. As shown more particularly in Fig. 3, each bell is supported upon an upright post 64 which is secured at its base to the board 63 and is suitably shouldered at its upper end to maintain the bell in proper position above the board. At the upper end of the post an arm 65 extends rearward, and at the free end of the arm 65 a hollow member 66 is located. This member is closed at its rear end and open at its end nearest the bell. Its interior dimensions are such that it serves as a resonator for the particular bell with which it is associated. Each bell 62 has its resonator 66 proportioned to conform to the note which the bell is adapted to produce. The bell is actuated by a tapper or hammer 67 upon an armature 68 associated with electro-magnetic coils 69 suitably mounted upon the board 63. Obviously when the coils 69 are energized, the armature 68 will cause the hammer 67 to strike the bell 62. The circuit is that of the ordinary electric bell and as the armature advances the circuit is broken at the point 70 and the armature is retracted by the spring 71 and again the circuit is closed to repeat the striking operation.

As shown in the diagram of Fig. 6, wherein the bell 62, associated with the plant member 33, has its electrical circuits shown, the conductor 39 is connected to one terminal dental removal. Obviously other changes will suggest themselves to persons desiring to utilize the device or familiar with stage devices of this class. If desired the two sections of the bed simulating member may be connected by hinges 100 and 101 secured to the bottoms 20. When so hinged, the two casings forming the bed member may be readily folded together, bottom to bottom, for insertion into a crate or box for shipment.

What I claim as new and desire to secure by a patent of the United States is:

1. A theatrical device comprising a support, a screen secured to said support and curved thereon to produce the backing of the upper surface of a scenic flower bed, a fabric stretched over said screen and decorated to represent the earth of the flower bed, tubular supports set in said screen at various points, and scenic members representing plants removably positioned in said tubular supports to complete the scenic representation of a formal bed of flowers.

2. A theatrical device comprising a support, a screen secured thereto and forming a curved surface above the support, a tube passing through an opening in the screen and having its upper end secured to the screen, and a fabric overspreading the screen and suitably decorated and pierced at a point in line with the opening in said tube.

3. A theatrical device having an open-ended casing simulating a flower bed, a series of tuned bells in said casing near its open end, designations upon the upper surface of said casing corresponding respectively to the bells therebeneath, scenic members representing flowers upon the upper surface of said casing, and electrical connections having terminals in said flowers and a manually operated terminal for controlling the selective operation of said bells.

4. A theatrical device having an open-ended casing simulating a flower bed, a plurality of sockets in the upper face of said casing, scenic members simulating flowering plants individually movable and capable of being variously positioned in said sockets, openings through the upper wall of the casing near its open end, electric lamps in said scenic members, electrical connections for said lamps extending from said scenic members over the upper surface of said casing to said openings respectively and therethrough to the interior of the casing, and means for connecting said connections to a suitable source of electricity.

5. A theatrical device having an open-ended casing simulating a flower bed, a plurality of sockets in the upper face of said casing, individual scenic members simulating flowering plants capable of being variously positioned in said sockets, a bank of tuned electrically operated bells within said casing, each scenic member being marked to correspond to one of said bells, openings through the upper wall of said casing, electric terminals upon said scenic members respectively, electrical connections from each of said terminals to its corresponding bell, passing through said openings, a manually operated terminal on a sprinkling can for selectively engaging said first mentioned terminals to selectively operate said bells.

In testimony whereof, I hereunto subscribe my name this 16th day of September, 1924.

PAUL PETCHING.

of the electro-magnet coils 69 through a plug and socket connector 72. The other terminal of the electro-magnet is connected through a similar connector 73 and conductor 74 with the main wire 75 which is adapted to be connected through connector 76 to one pole of the battery 77. Conductor 38 is in like manner connected through connector 78 and conductor 79 to the same battery wire 75. Other connections to this battery wire for other plant circuits are indicated by the wires $74^a$, $79^a$, and $74^b$, $79^b$. The other terminal of the battery 77 is connected through connector 80 with conductor 81 which terminates in a terminal 82 mounted upon the sprinkling can 83. With this arrangement it will be seen that when the manually operated terminal 82 engages terminal 34, with the parts connected as shown, a circuit will be completed, which may be traced from one pole of battery 77 through connector 80, conductor 81, terminal 82, terminal 34, there dividing, one path including conductor 39, connector 72, coils 69, contact 70, armature 68, connector 73, conductor 74 to the main battery wire 75, the other path including lamps 35, 36 and 37 in series, conductor 38, connector 78, and conductor 79 to the same battery wire 75, the circuit continuing through conductor 75 and connector 76 to the other pole of the battery 77. It will be seen that this circuit will cause the bell 62, associated with plant 33, to make and break its circuit and thereby ring the bell. It will also be seen that the circuit through the lamps in the plant member 33 is closed and said lamps are lighted so long as the circuit is maintained. It will be obvious that when other plant terminals are engaged by the movable terminal 82, the corresponding lamps and bell will be actuated. In this way the player by moving around from point to point may touch the different plant terminals and operate the different bells in a predetermined sequence and in timed relation so as to play desired tunes, all in accordance with the notations upon the upper face of the bed simulating member, as indicated in Fig. 1. In such use of the device the operator may play by note or by memorizing the numbers associated with the different bells and playing in accordance with the numbers.

When it is desired to pack the device for shipment, the several conductors corresponding to the conductors 38 and 39 of plant member 33 may be disconnected by the plug and socket connectors, corresponding to the connectors 72 and 78. The conductors may then be withdrawn from the bed by drawing them through the appropriate holes adjacent to their respective bells. In this way the several plants may be removed from the bed simulating member. In packing, these may be, if desired, thrust within the bed members themselves. The bells on the other hand are disconnected from the main battery wire 75 by separating the connectors, such as connectors 73 and 78, and then each bank of bells may be removed from its casing and packed in a suitable box or container. The battery in like manner may be separated by opening connectors 76 and 80. In some instances, it may be desirable to identify certain plant members with particular bells to show how the conductors are to be threaded through the openings adjacent to the bells. In such case each plant member may be provided with a tag, such as the tag 84, upon the plant member 33. In this instance the tag is designated "B–5½." This indicates that the particular plant is to have its wires extended to the bell 62 which lies below the designation "B–5½." Obviously, the designation "B" alone might be used, or the designation "5½," or these designations might be replaced by others.

It will be understood that in utilizing my invention the bells employed might be tuned otherwise than herein disclosed, and the number of bells employed might be varied, depending largely upon the requirements of the pieces to be played, and other circumstances which might vary in different situations. It will also be apparent that some of the plant indicating members might be used without electrical connections, and in other instances terminals might be employed which were not directly mounted upon a stem provided with artificial foliage. As previously indicated, the user of the device may play tunes by following the designation of notes upon the bed simulating member, or he may play by using the numeral notations. It will also be apparent that in some instances the lighting effects might be desired without the musical effects, or vice versa. In such case the circuits could be varied as desired by making or breaking the lamp or bell circuits at connectors, such as connector 78 in the case of the lamps, or at connectors such as 72 or 73 in the case of the bells. In view of the many changes which may be made in the particular disclosure herein presented, and the many ways in which the device may be employed, I do not wish to be unduly restricted to the specific matter shown and described, or to the specific means of utilization of the same, but aim to cover these changes in design and uses by the terms of the appended claims. Obviously new flower simulating members might be readily added by placing new sockets 31 in the screen 28 at desired points. Little work would be required in doing so because the fabric 30 could be readily pierced at the desired point and the socket slipped into place in a hole in the screen and there quickly soldered against acci-